Aug. 19, 1952  L. SKOVRAN  2,607,388
ANTISKID DEVICE
Filed April 5, 1948
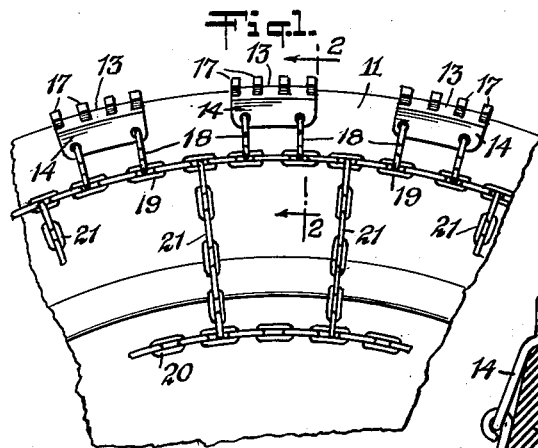
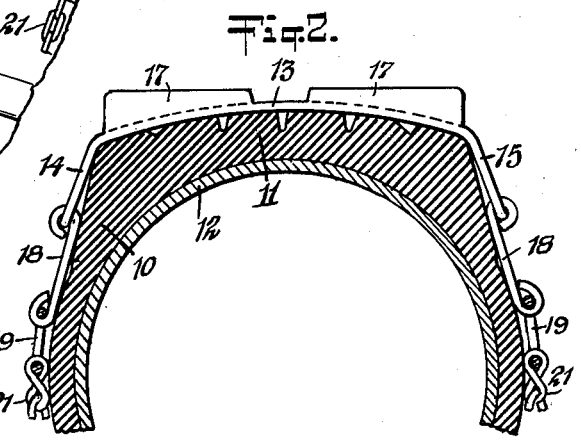
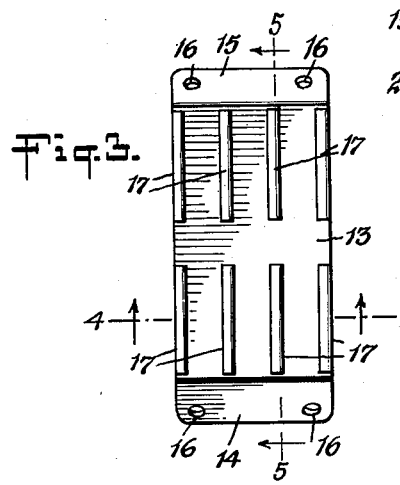
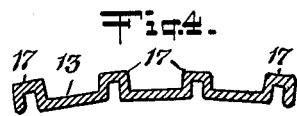
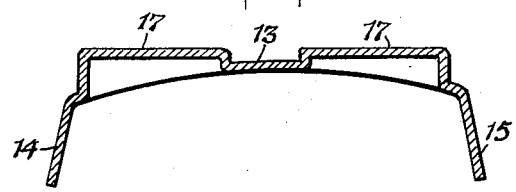
INVENTOR.
Latze Skovran
BY
Munn, Liddy & Glaccum
Attorneys

Patented Aug. 19, 1952

2,607,388

UNITED STATES PATENT OFFICE 2,607,388

ANTISKID DEVICE

Latze Skovran, Brooklyn, N. Y.

Application April 5, 1948, Serial No. 18,982

1 Claim. (Cl. 152—228)

This invention relates to new and useful improvements in anti-skid devices for tires.

An object of the invention is to produce an anti-skid device which is simple, economical, efficinet and durable.

A further object is to produce a device which can be very quickly and easily applied to a tire and can be easily replaced in a series of them when one may perhaps break in use without disturbing the others in the series.

A further object is to provide a device in which the structure and its function result in a very definite and positive action to prevent skidding under all conditions and to achieve a very firm grip on the road surface at all times.

Further and more specific objects, features and advantages will more clearly appear from a consideration of the detailed specification hereinafter set forth, especially when taken in connection with the accompanying drawings which illustrate a present preferred form which the invention may assume and which form part of the specification.

In brief and general terms, the invention comprises an anti-skid plate disposable across the tread of the tire and provided with a series of raised ribs or grip elements running longitudinally thereof. The plate has downwardly curved end portions to extend down slightly along the side of the tread and to connect to chains or other adjustable connections whereby the plate may be firmly anchored in position on the tread.

Preferably the plate with the grip elements and the dependent ends are made of one piece of material and each plate forms one of a preferred series around the tire tread and are held together in the usual manner by chains or similar adjustable devices.

The present preferred form which the invention may assume is illustrated in the drawings of which:

Fig. 1 is a partial side elevation of the invention disposed on a tire;

Fig. 2 is a vertical cross section taken on the line 2—2 of Fig. 1;

Fig. 3 is a plan view of one of the plates;

Fig. 4 is a vertical section taken on the line 4—4 of Fig. 3; and,

Fig. 5 is a vertical cross section taken on the line 5—5 of Fig. 3.

Referring now merely to the specific form of the invention shown in the drawings, it is to be noted that it is applied to a tire 10 having a tread 11 and an inner tube 12. Disposed across the top of the tread 11 is a plate 13 preferably made of cast or stamped metal and in one piece with dependent end portions 14 and 15 which are bent around to extend down partly along the side of the tread 11. This plate may be one of a series of such plates disposed along the periphery of the tread 11.

Each plate is provided with a series of raised ribs 17 preferably integrally formed and disposed longitudinally of the plate to act as anti-skid or grip elements. As shown they may be arranged in spaced groups of four on each side of the peripheral transverse center line of the plate. The end portions 14 and 15 are provided with holes 16 for attachment of links 18 which in turn are connected in any suitable manner to adjustable elements to tighten the plates on the tread. These elements may take the form of chains 19 and 20 disposed concentrically of the wheel center and connected by spaced cross-connector chains 21. Any suitable means, not shown, may be used to tighten the chains to firmly hold the plate, or a series of them on the tread.

The ribs 17 are of sufficient length and elevation above the main plate 13 to provide a firm gripping action on the road even when covered by snow and ice and effectively prevent skidding and slipping and to secure ample traction at all times. It is obvious that if one plate 13 breaks it does not necessarily affect the action of the other plates and that it can be removed and a new one replaced in the series without dismantling the whole device from the tire. The dependent relation of the ends of the plates tends to assist in maintaining the plates in operative position on the tread.

Thus it can be seen that the device is extremely simple, can be stamped out economically, is strong, durable and easily adjusted in position, and readily removed and replaced when desired.

While the invention has been described in detail and shown with respect to the accompanying drawing, it is not to be limited to such details, since many changes and modifications may be made in the invention without departing from the spirit and scope thereof. Hence it is desired to cover any and all forms and modifications of the invention which may come within the language and scope of the appended claim.

What I claim as my invention is:

An anti-skid device which includes a rigid, slightly curved, elongate plate shaped to lie closely and transversely across the tread of a tire, dependent flanges on the opposite ends of said plate and disposed closely adjacent the sides of the tread, two sets of spaced elevated ribs, each set comprising a plurality of similar shaped ribs disposed on the upper surface of said plate and extending in a longitudinal direction thereon, the corresponding ribs of the two sets being disposed in longitudinal alignment, the adjacent ends of said corresponding ribs of said sets being spaced apart from the transverse center line of said plate, the top surfaces of all said ribs being disposed in a plane at a right angle to the radius of the tire extending from the center of the tire to the transverse medial line of the plate.

LATZE SKOVRAN.

REFERENCES CITED

The following references are of record in the file of this patent:

UNITED STATES PATENTS

| Number | Name | Date |
| --- | --- | --- |
| 998,366 | Mancini | July 18, 1911 |
| 1,017,909 | Reid | Feb. 20, 1912 |
| 1,372,958 | Klare | Mar. 29, 1921 |
| 1,431,856 | Walters | Oct. 10, 1922 |
| 1,448,347 | Hess | Mar. 13, 1923 |

FOREIGN PATENTS

| Number | Country | Date |
| --- | --- | --- |
| 794,492 | France | Feb. 18, 1936 |